United States Patent
Hamada et al.

(10) Patent No.: US 8,785,014 B2
(45) Date of Patent: Jul. 22, 2014

(54) NICKEL-METAL HYDRIDE SECONDARY BATTERY MODULE AND SECONDARY BATTERY MODULE MANUFACTURING METHOD

(75) Inventors: Shinji Hamada, Toyohashi (JP); Hideki Kasahara, Ikeda (JP); Shinichiro Ito, Kosai (JP); Hideki Ando, Toyohashi (JP); Toyohiko Eto, Toyota (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 1488 days.

(21) Appl. No.: 12/155,901

(22) Filed: Jun. 11, 2008

(65) Prior Publication Data

US 2009/0068549 A1  Mar. 12, 2009

(30) Foreign Application Priority Data

Jun. 13, 2007 (JP) ................ 2007-156080

(51) Int. Cl.
*H01M 2/12* (2006.01)
(52) U.S. Cl.
USPC ............................................ 429/56; 429/154
(58) Field of Classification Search
USPC ............ 429/53, 54–56, 82–89, 149, 154, 163
See application file for complete search history.

(56) References Cited

U.S. PATENT DOCUMENTS

| | | | | |
|---|---|---|---|---|
| 6,569,561 B1* | 5/2003 | Kimura et al. | ................ | 429/159 |
| 6,982,131 B1* | 1/2006 | Hamada et al. | ................ | 429/148 |
| 7,255,964 B2* | 8/2007 | Fukuda et al. | ................ | 429/233 |
| 7,547,487 B1* | 6/2009 | Smith et al. | ..................... | 429/83 |
| 2003/0017384 A1* | 1/2003 | Marukawa et al. | ........... | 429/120 |
| 2003/0027044 A1* | 2/2003 | Asahina et al. | ................ | 429/179 |
| 2003/0138692 A1* | 7/2003 | Asahina et al. | ................ | 429/158 |
| 2007/0202402 A1* | 8/2007 | Asahina et al. | ................ | 429/210 |
| 2007/0254211 A1* | 11/2007 | Kambe et al. | ................. | 429/160 |

FOREIGN PATENT DOCUMENTS

JP    A-2004-319096    11/2004

\* cited by examiner

*Primary Examiner* — Carlos Barcena
(74) *Attorney, Agent, or Firm* — Oliff PLC

(57) ABSTRACT

A nickel-metal hydride secondary battery includes: a plurality of power generating elements each having a negative plate containing hydrogen absorbing alloy; a battery case provided with partition walls and a plurality of compartments arranged adjacently on both sides of each partition wall, each of the compartments accommodating each power generating element, and the compartments allowing gas intercommunication between compartments through communication holes formed in the partition walls; and at least one of safety valves placed on the battery case, the safety valves being less in number than the number of the compartments; wherein each of the communication holes has a hole sectional area per battery module capacity in a range 0.03 to 0.30 mm$^2$/Ah.

2 Claims, 8 Drawing Sheets

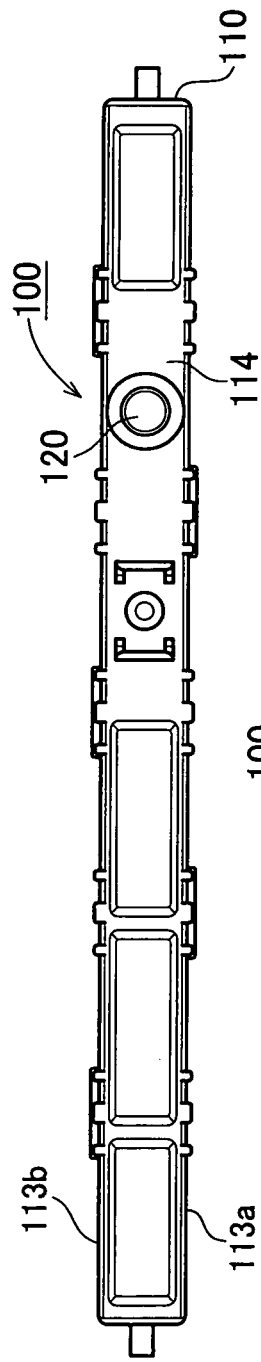
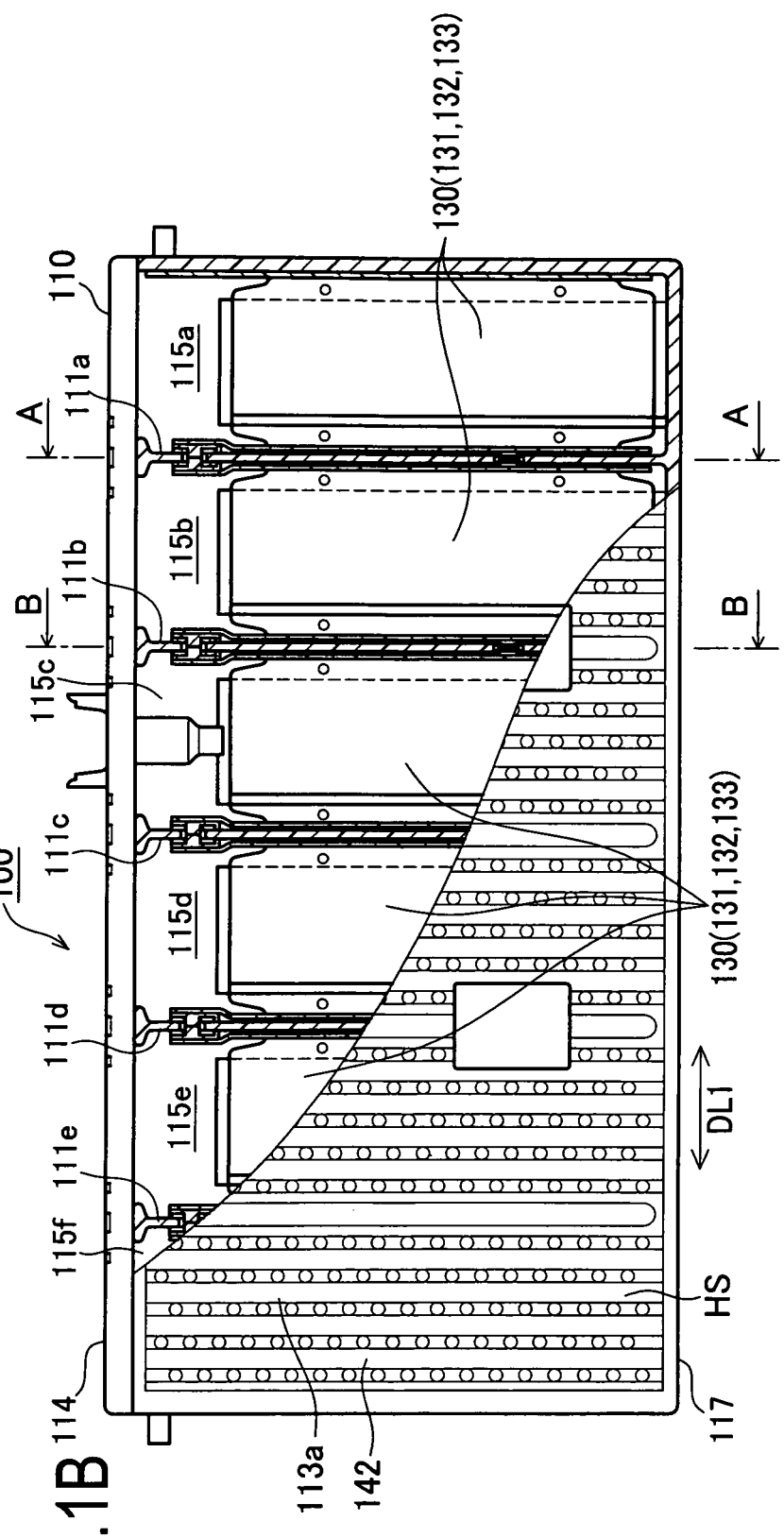

FIG. 4

| LINE | | 1ST COM. | 2ND COM. | 3RD COM. | 4TH COM. | 5TH COM. | 6TH COM. | TOTAL |
|---|---|---|---|---|---|---|---|---|
| L1 | Decreased amount of Discharge reserve of each Power generating element by Oxygen gas injection into 1ST Compartment | 0.86Ah | 0.58Ah | 0.29Ah | 0.17Ah | 0.06Ah | 0.03Ah | 1.99Ah |
| L2 | Decreased amount of Discharge reserve of each Power generating element by Oxygen gas injection into 3RD Compartment | 0.29Ah | 0.29Ah | 0.51Ah | 0.29Ah | 0.19Ah | 0.08Ah | 1.65Ah |
| L3 | Distribution Rate of Oxygen gas generated in 1ST Compartment | 43.2% | 29.1% | 14.6% | 8.5% | 3.0% | 1.5% | 100.0% |
| L4 | Increase/Decrease in Amount of Reserve by Oxygen gas generated in 1ST Compartment | +56.8% | −29.1% | −14.6% | −8.5% | −3.0% | −1.5% | 0.0% |
| L5 | Distribution rate of Oxygen gas generated in 3RD Compartment | 17.6% | 17.6% | 30.9% | 17.6% | 11.5% | 4.8% | 100.0% |
| L6 | Increase/Decrease in Amount of Reserve by Oxygen gas generated in 3RD Compartment | −17.6% | −17.6% | +69.1% | −17.6% | −11.5% | −4.8% | 0.0% |
| L7 | Distribution rate of Oxygen gas generated in 2ND Compartment | 28.4% | 37.0% | 18.5% | 9.2% | 4.6% | 2.3% | 100.0% |
| L8 | Increase/Decrease in Amount of Reserve by Oxygen gas generated in 2ND Compartment | −28.4% | +63.0% | −18.5% | −9.2% | −4.6% | −2.3% | 0.0% |
| L9 | Increase/Decrease in Amount of Reserve by Oxygen gas generated in 4TH Compartment | −4.8% | −11.5% | −17.6% | +69.1% | −17.6% | −17.6% | 0.0% |
| L10 | Increase/Decrease in Amount of Reserve by Oxygen gas generated in 5TH Compartment | −2.3% | −2.6% | −9.2% | −18.5% | +63.0% | −28.4% | 0.0% |
| L11 | Increase/Decrease in Amount of Reserve by Oxygen gas generated in 6TH Compartment | −1.5% | −3.0% | −8.5% | −14.6% | −29.1% | +56.8% | 0.0% |
| L12 | Increase/Decrease in Amount of Reserve when Oxygen gas of the same amount is generated in every compartment (Sum of L4, L6, L8, L9, L10, and L11) | +2.1% | −2.8% | +0.7% | +0.7% | −2.8% | +2.1% | 0.0% |

COM.: COMPARTMENT

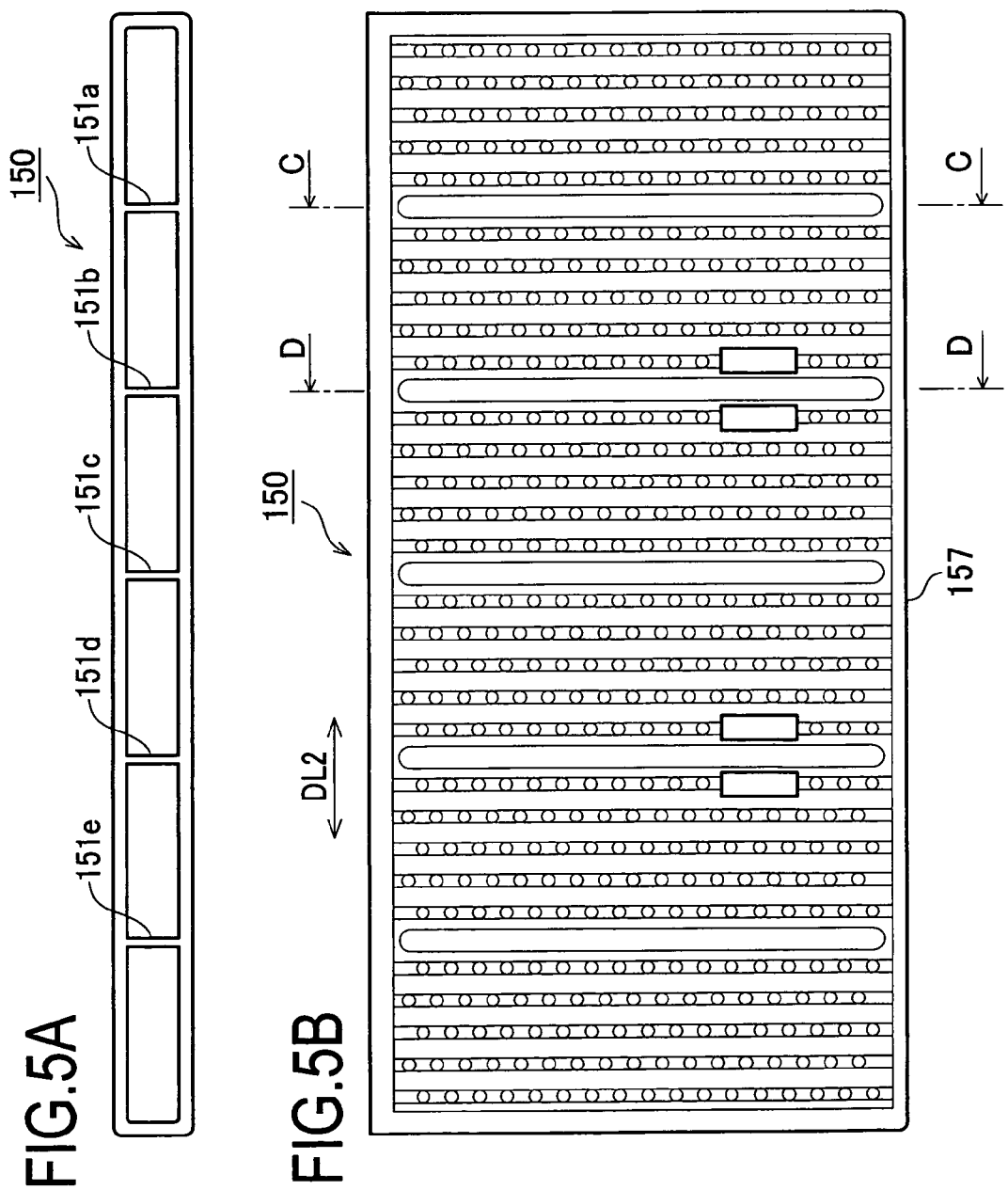

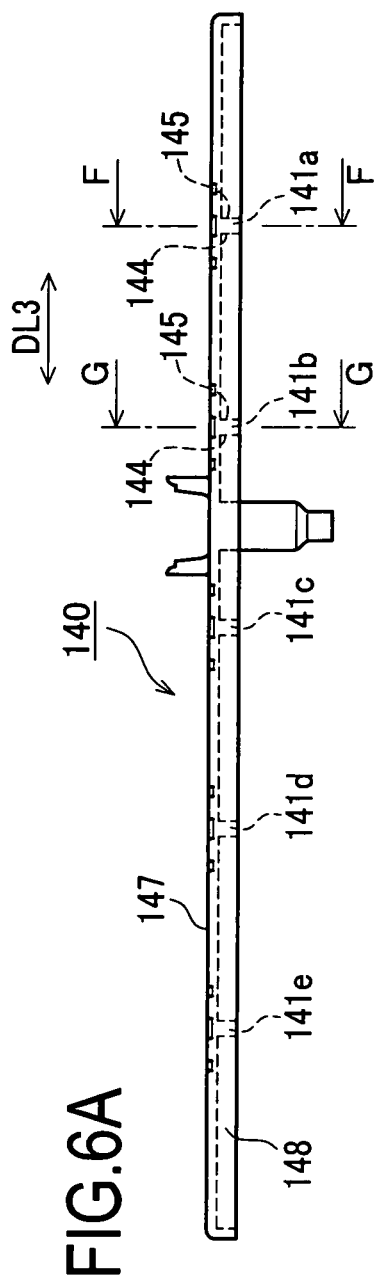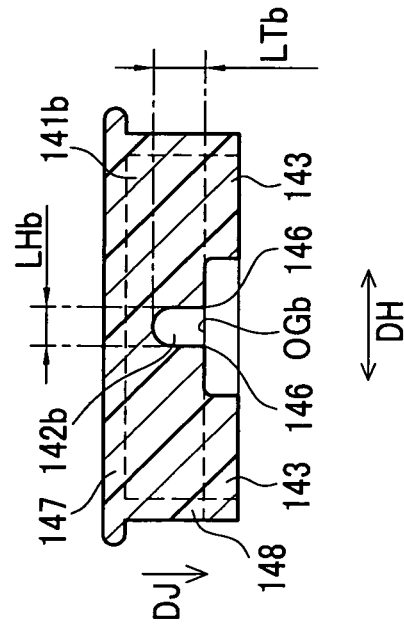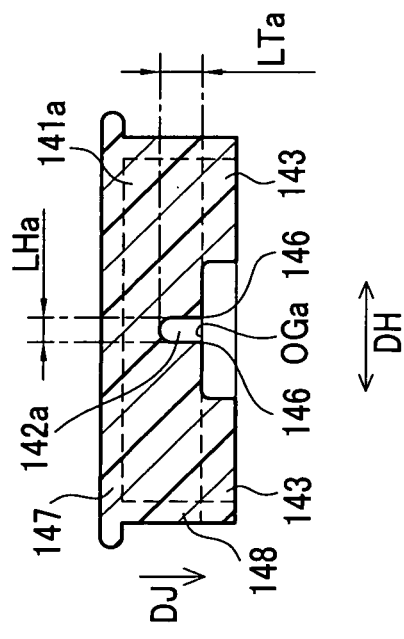
FIG.6A
FIG.6B
FIG.6C

FIG.7
(a) 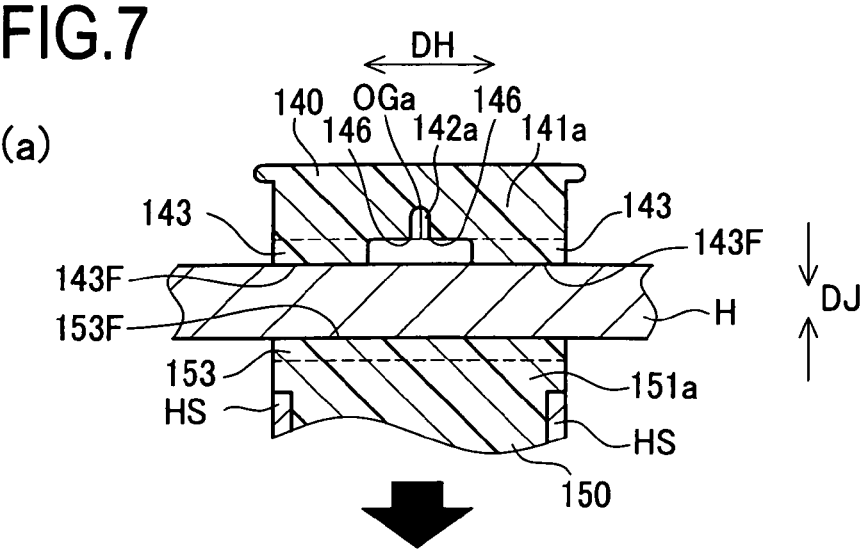
(b) 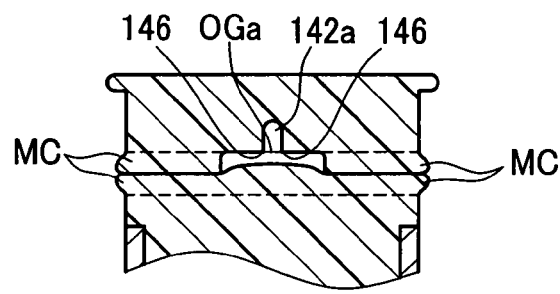
(c) 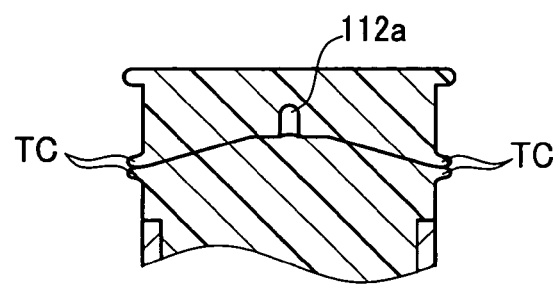
(d) 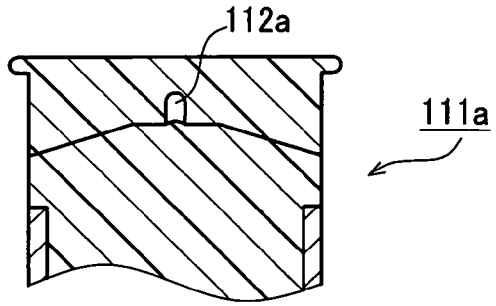

FIG.8
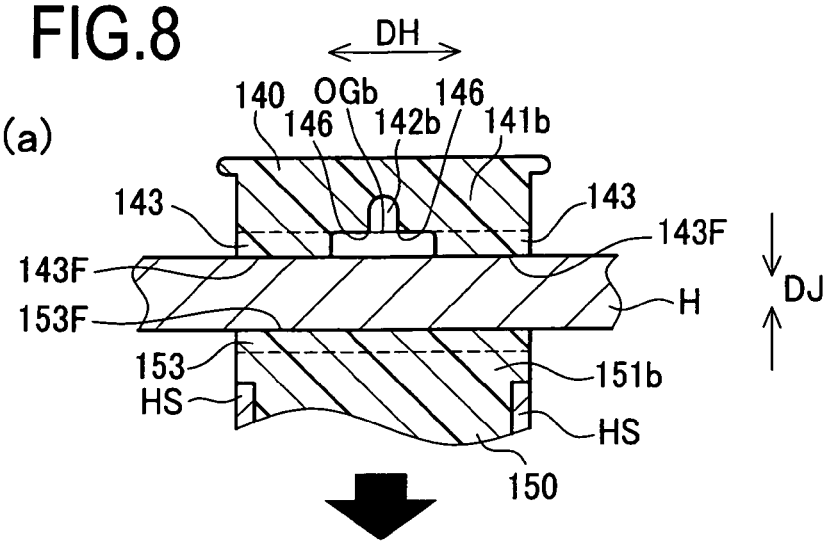
(a)
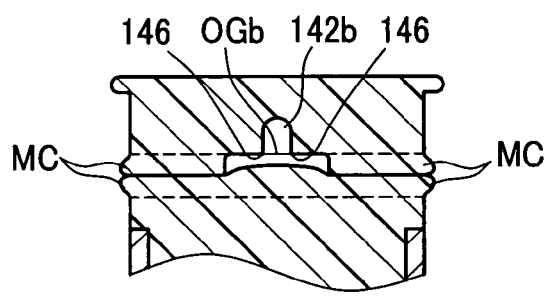
(b)
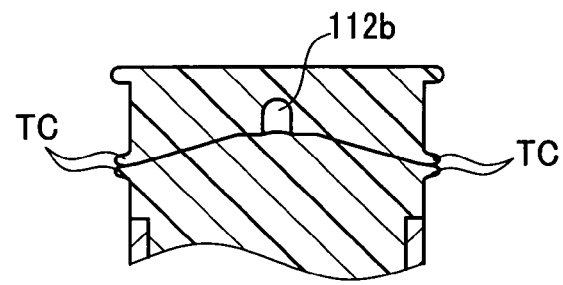
(c)
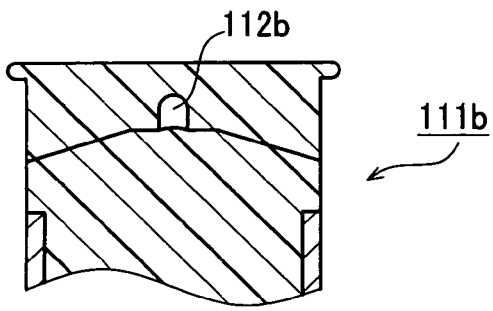
(d)

NICKEL-METAL HYDRIDE SECONDARY BATTERY MODULE AND SECONDARY BATTERY MODULE MANUFACTURING METHOD

BACKGROUND OF THE INVENTION

1. Field of the Invention

The present invention relates to a nickel-metal hydride secondary battery module including a plurality of compartments each accommodating a power generating element, the compartments being communicated with one another, and a secondary battery module manufacturing method.

2. Description of Related Art

Some secondary batteries are each provided with a safety valve in a battery case formed with compartments each of which accommodates a power generating element. This safety valve will be opened when gas is generated from the power generating element and the inner pressure of the compartment increases abnormally, so that the gas is safely released to prevent deformation or breakage of the compartment.

In the case of a secondary battery designed such that the battery case has a plurality of compartments each of which accommodates a power generating element, it is preferable to provide a safety valve for each compartment. However, such configuration needs many safety valves. Accordingly, as disclosed in JP2004-319096A, there has been proposed a nickel-metal hydride secondary battery (a nickel-metal hydride secondary battery module) provided with partition walls separating battery chambers (compartments) are formed with communication holes through which the compartments are communicated with one another and a single safety valve is provided in a battery case.

In this nickel-metal hydride secondary battery module disclosed in JP2004-319096A, the gas generated from any of the power generating elements could be released safely through the communication holes and the safety valve.

BRIEF SUMMARY OF THE INVENTION

However, in the nickel-metal hydride secondary battery module disclosed in JP2004-319096A, oxygen gas will be generated from the power generating elements due to polarization of the power generating elements or other causes. In the case where the partial pressure of the generated oxygen gas vary from compartment to compartment, even if the compartments are equal in inner pressure, the oxygen gas will transfer from a compartment with a higher oxygen partial pressure to a compartment with a lower oxygen partial pressure through the communication holes in order to make the oxygen gas partial pressure equal between the compartments. In the power generating element housed in each compartment in which oxygen gas has flowed from another compartment, the oxygen gas consumes hydrogen stored as discharge reserve (recombines with the hydrogen to make water). Thus, an amount of discharge reserve of this power generating element (negative electrode) will decrease. This results in variations (differences) in discharge reserve between the power generating elements. If the secondary battery module is continuously used in this state, the variations will become large and one of some of the power generating elements will be greatly decreased in discharge capacity. The secondary battery module is likely to early deteriorate in capacity.

The present invention has been made in view of the above circumstances and has an object to provide a nickel-metal hydride secondary battery module that is provided with communication holes formed in partition walls and also a safety valve(s) less numerous than compartments, and that can restrain transfer of oxygen gas from compartment to compartment and reduce variations in discharge reserve between the power generating elements.

Another object of the invention is to a secondary battery module manufacturing method capable of forming a communication hole with an appropriate dimension.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a nickel-metal hydride secondary battery module comprising: a plurality of power generating elements each having a negative plate containing hydrogen absorbing alloy; a battery case provided with partition walls and a plurality of compartments arranged adjacently on both sides of each partition wall, each of the compartments accommodating each power generating element, and the compartments allowing gas intercommunication between compartments through communication holes formed in the partition walls; and at least one of safety valves placed on the battery case, the safety valves being less in number than the number of the compartments; wherein each of the communication holes has a hole sectional area per battery module capacity in a range 0.03 to 0.30 mm$^2$/Ah.

In the nickel-metal hydride secondary battery module of the invention, each communication hole in each partition wall has a hole sectional area per battery module capacity in a range 0.03 to 0.30 mm$^2$/Ah. Accordingly, even when gas is generated from the power generating element of any compartment, abnormally increasing the inner pressure of the concerned compartment, the module can release the gas through the communication holes and the safety valve opened. Further, in the case where the amount of oxygen gas generated from each power generating element is different from compartment to compartment and hence oxygen partial pressure also differs from compartment to compartment, the oxygen gas attempts to transfer to another compartment in order to keep balance of oxygen concentration between the compartments, but its transfer is restricted. In other word, the module can restrain transfer of oxygen gas to another compartment to prevent consumption of hydrogen absorbed in the power generating element in a destination compartment. Consequently, this nickel-metal hydride secondary battery module can reduce the variations in hydrogen absorbing amount between the power generating elements, that is, variations in discharge reserve.

Each communication hole is a through hole which allows gas to flow to and from adjacent compartments defined by the partition walls. Each communication hole is therefore preferably provided in the upper part of each compartment where electrolyte in adjacent compartments will not contact each other. The battery case may be preferably made of a material resistant to the electrolyte, for example, resin.

In the above nickel-metal hydride secondary battery module, preferably, the battery case includes four or more compartments arranged in a row and three or more partition walls; when the partition walls located in outermost ends in a row direction of the compartments are referred to as outermost partition walls, outermost communication holes of the communication holes are formed in the outermost partition walls and each have a hole sectional area smaller than that of other communication holes formed in the partition walls other than the outermost partition walls.

The nickel-metal hydride secondary battery module having four or more compartments and three or more partition walls is first explained below. Of four or more compartments, outermost compartments located in the outermost ends of the battery case and the inside compartments located inside between the outermost compartments differ in the number of communication holes each providing intercommunication between an own compartment and another. Specifically, each outermost compartment includes a single outermost communication hole in the outermost partition wall and each inside compartment includes two communication holes in the partition walls defining the compartment.

Meanwhile, suppose that oxygen gas is generated from the power generating element accommodated in the inside compartment with two communication holes and the oxygen gas partial pressure in that inside compartment increases than that in other compartments. In this case, most of the generated oxygen gas is recombined with hydrogen of a negative electrode in this inside compartment to make water. Part of the oxygen gas will transfer to adjacent compartments through the two communication holes because of high partial pressure. That is, the part of the oxygen gas is split into two flows transferring to the adjacent compartments.

On the other hand, in the case where oxygen gas is generated from the power generating element accommodated in the outermost compartment and the oxygen gas partial pressure thereof increases than the other compartments, the oxygen gas is allowed to transfer to the compartment next (hereinafter, referred to as an adjacent compartment) to the outermost compartment through the single communication hole (the outermost communication hole). That is, the oxygen gas is not split but is allowed to transfer to the adjacent compartment. Accordingly, as to this adjacent compartment which is also the inside compartment, part of the oxygen gas generated in this adjacent compartment will transfer to the compartments on both sides thereof (i.e. the outermost compartment and an opposite adjacent inside compartment) through the two communication holes (i.e. the outermost communication hole and the opposite communication hole). However, both the concerned adjacent compartment and the other adjacent inside compartment opposite the outermost compartment are the inside compartments (the compartments each having two communication holes) and placed under almost the same condition. From a long-term viewpoint, accordingly, the oxygen gas transfer between them is thought to balance out each other and become almost the same levels.

However, as to the oxygen gas transfer between the outermost compartment and the adjacent compartment through the outermost communication hole, from a long-term standpoint, the transfer from the outermost compartment to the adjacent compartment will become larger in amount than the reverse transfer.

In this adjacent compartment, therefore, the hydrogen absorbed in the power generating element will be consumed by the oxygen gas that has transferred therein from the other compartments (in particular, the outermost compartment). Specifically, it is considered that the discharge reserve of the power generating element (a negative electrode) accommodated in the adjacent compartment greatly decreases. Under this influence, there may be a case where somewhat variations in discharge reserve also occur between the power generating elements accommodated in the other inside compartments.

The nickel-metal hydride secondary battery module of the invention is therefore adopted such that the hole area of each of the outermost communication holes formed in the outermost partition walls is smaller than the hole area of each of the communication holes formed in the partition walls other than the outermost partition walls. This makes it possible to restrict an amount of oxygen gas to be allowed to pass through the outermost through holes. In other words, it is reliably possible to reduce the oxygen gas from transferring from the outermost compartment to the adjacent compartment and hence to prevent consumption of hydrogen absorbed in the power generating element accommodated in that adjacent compartment. Consequently, this nickel-metal hydride battery module can surely reduce variations in discharge reserve between the power generating elements.

According to another aspect, the invention provides a method of manufacturing a secondary battery module comprising: a plurality of power generating elements; a battery case provided with partition walls and a plurality of compartments arranged adjacently on both sides of each partition wall, each of the compartments accommodating each power generating element, and the compartments allowing gas intercommunication between compartments through communication holes formed in the partition walls; and at least one of safety valves placed on the battery case, the safety valves being less in number than the number of the compartments; wherein the battery case is formed of a first case member and a second case member which are made of resin, the first case member includes a plate-shaped first partition wall portion which forms part of the partition wall, the second case member includes a plate-shaped second partition wall portion which forms another part of the partition wall, the second partition wall portion being to be welded to the first partition wall portion in a butting direction perpendicular to a thickness of the first and second partition wall portions, the first partition wall portion includes: a communication groove extending in the thickness direction of the first partition wall portion to provide communication between front and rear surfaces thereof, the communication groove having a shape opening in a side which will face the second partition wall portion when the first partition wall portion is to be welded to the second partition wall portion; and two first melting portions spaced respectively from opening edges of the communication groove which will face the second partition wall portion and in a groove width direction perpendicular to the butting direction and the plate thickness direction, each first melting portion being to be placed in a position closer to the second partition wall portion than the communication groove and melted and deformed when welded to the second partition wall portions, the method comprises a case welding step of welding the first case member and a second case member to form the battery case, the case welding step including: melting at least the first melting portion out of the first melting portion of the first partition wall portion and the second partition wall portion, butting and welding the first and second partition wall portions to each other in the butting direction so that a resin material derived from the molten first melting portion or second partition wall fills a clearance between the first melting portions and reaches at least the opening edges of the communication groove to close an opening of the communication groove facing to the second partition wall portion, thereby forming the communication hole defined by at least part of the communication groove.

According to the secondary battery module manufacturing method of the invention, in the first case member, the communication groove is formed in the first partition wall portion, and the first melting portions are provided to be spaced from the opening edges of the communication groove closer to the second partition wall portion. The first and second partition wall portions are then butt-welded so that the resin derived from the molten first melting portions or second partition wall portion fills up the clearance between the first melting portions to reach the opening edges of the communication groove. In other words, the molten resin does not directly move to the opening edges of the communication groove. The molten resin reaches the opening edges while filling up the clearance between the first melting portions. This makes it possible to prevent the resin from deeply entering the communication groove and filling up the entire communication groove.

Since the resin reaches at least the opening edges of the communication groove, the opening of the communication groove closer to the second partition wall can be closed and the communication hole can be formed by at least part of the communication groove. Thus, the secondary battery module provided with the partition walls having the communication holes can reliably be manufactured. Accordingly, the secondary battery module can be manufactured so that even if the inner pressure of any of the compartments abnormally increases due to gas generation from the power generating element, the safety valve can be opened to release the gas through the communication holes.

In the above secondary battery module manufacturing method, preferably, the secondary battery module is a nickel-metal hydride secondary battery module, and the communication hole has a hole sectional area per battery module capacity in a range 0.03 to 0.30 mm$^2$/Ah.

According to the secondary battery module manufacturing method of the invention, the hole area of each communication hole per battery module capacity is set in a range of 0.03 to 0.30 mm$^2$/Ah. Even if oxygen gas attempts to transfer to other compartments because of a variation in oxygen partial pressure from component to component, such gas transfer can be reduced in amount and hence variations in discharge reserve can reliably be reduced. Consequently, the nickel-metal hydride secondary battery module can be readily and reliably manufactured so that variations in discharge reserve between the power generating elements can reliably be reduced.

In the above secondary battery module manufacturing method, preferably, the communication groove has a deep groove shape having a larger dimension in the butting direction than a dimension in the groove width direction.

According to the secondary battery module manufacturing method of the invention, the communication groove of the first case member is formed in a deep groove shape having the size in the butting direction larger than the size in the groove width direction. In the case welding step, therefore, after the opening of the communication groove closer to the second partition wall is closed by the molten resin that has reached the opening edges, this resin may further flow in but is hard to deeply enter the communication groove. Consequently, the secondary battery module can be manufactured so that each communication groove is unlikely to be filled up with the resin, and each communication hole can be reliably formed with a hole area per battery module capacity in the above range.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 1A is a top view of a module in a preferred embodiment;

FIG. 1B is a partly cutaway side view of the module;

FIG. 4 is a table showing increase/decrease in amount of discharge reserve of each power generating element resulting from the case where oxygen gas of the same amount occurs in each compartment of the module;

FIG. 5A is a top view of a case body used in the embodiment;

FIG. 5B is a side view of the case body;

FIG. 5C is an enlarged section view showing a section of a body-side partition wall portion, corresponding to a section view taken along a line C-C and a line D-D in FIG. 5B;

FIG. 6A is a side view of a cover used in the embodiment;

FIG. 6B is a section view of a cover-side first partition wall portion of the cover, taken along a line F-F in FIG. 6A;

FIG. 6C is a section view of a second cover-side partition wall portion of the cover, taken along a line G-G in FIG. 6A;

FIG. 7 is a sectional explanation view showing a welding process of a case of the module in the embodiment, in which the first cover-side partition wall and the first body-side partition wall are welded to each other (a circle E in FIG. 5C and FIG. 6B); and FIG. 8 is a sectional explanation view showing a welding process of the case of the module in the embodiment, in which the second cover-side partition wall and the second body-side partition wall are welded to each other (the circle E in FIG. 5C and FIG. 6C).

DETAILED DESCRIPTION OF THE PREFERRED EMBODIMENTS

Figure 2A:
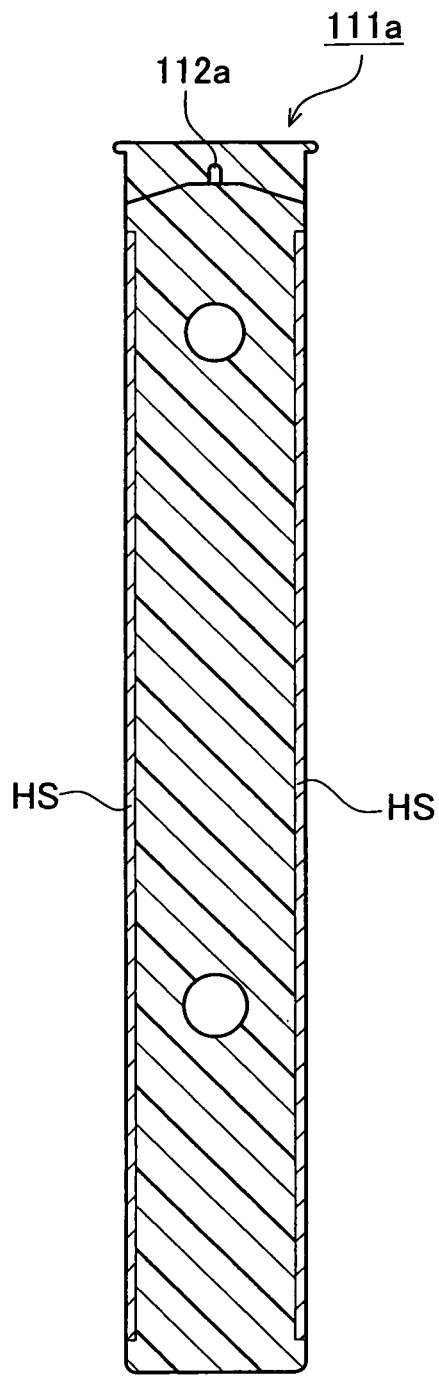
FIG. 2A is a vertical section view of a first partition wall of the module in the embodiment, taken along a line A-A in FIG. 1.

A detailed description of a preferred embodiment of the present invention will now be given referring to the accompanying drawings.

A nickel-metal hydride secondary battery module 100 (herein, also simply referred to as a "module" 100) of the present embodiment includes, as shown in FIG. 1, a battery case 110 with six compartments 115, power generating elements 130 accommodated one in each of the compartments 115 of the battery case 110, and a safety valve 120 placed on the top of the battery case 110.

The battery case 110 is of a rectangular box shape made of resin having six outer surfaces, of which first and second outer surfaces 113a and 113b each having a wider area are partly covered with a heat sink HS made of a metal plate having protrusions. The battery case 110 is internally formed with five partition walls 111 whereby the interior space of the battery case 110 is equally partitioned (six equal sections) in a longitudinal direction DL1, forming six compartments 115. Each of the compartments 115 contains an electrolyte (not shown). In each compartment 115, further, the aforementioned power generating element 130 is accommodated in a position closer to a bottom 117 (a lower position in FIG. 1B). The module 100 of this embodiment will be used with the bottom 117 of the battery case 110 facing down and hence a space is left above each power generating element 113.

Herein, of the above six compartments 115, an outermost right one in the longitudinal direction DL1 (in a row direction of the compartments 115) in FIG. 1 is referred to as a first compartment 115a. Other compartments 115 are referred, in the order from one arranged to the left of the first compartment 115a, to as a second compartment 115b, a third compartment 115c, a fourth compartment 115d, a fifth compartment 115e, and a sixth compartment 115f respectively. The first compartment 115a and the sixth compartment 115f correspond to an outermost compartment of the invention. The second compartment 115b and the fifth compartment 115e correspond to an adjacent compartment of the invention. The third compartment 115c and the fourth compartment 115d correspond to an inside compartment of the invention.

Of the above five partition walls 111, an outermost right one that is placed in the longitudinal direction DL1 in FIG. 1 and that partitions the first compartment 115a and the second compartment 115b is referred to as a first partition wall 111a. Other partition walls 111 are also referred, in the order from one arranged to the left of the first partition wall 111a, to as a second partition wall 111b, a third partition wall 111c, a fourth partition wall 111d, and a fifth partition wall 111e respectively. The first partition wall 111a and the fifth partition wall 111e correspond to an outermost partition wall of the invention.

Each power generating element 130 is constituted by negative electrodes (negative plate) 131, positive electrodes 132, separators 133, and an electrolyte not shown.

The negative electrode 131 is an electrode plate containing hydrogen absorbing alloy as a negative electrode component. The positive electrode 132 is an electrode plate containing an active material support such as foamed nickel and an active material which contains nickel hydroxide and is supported by the active material support. The separator 133 is a nonwoven fabric made of resin subjected to a hydrophilic treatment. The electrolyte is an alkaline aqueous solution containing KOH and having a specific gravity of 1.2 to 1.4.

The negative electrodes 131 and the positive electrodes 132 are alternately laminated interposing the separators 133 one each between them to form a laminated body. This laminated body is impregnated with the electrolyte. The power generating elements 130 are electrically connected in series to each other in the battery case 110. A battery capacity (nominal capacity) of the module 100 of this embodiment is 6.5 Ah. In this embodiment, the power generating element 130 is designed to have a negative electrode capacity larger than a positive electrode capacity so that the negative electrodes 131 have a discharge reserve or the like.

The single safety valve 120 is placed on an upper main surface 114 of the battery case 110, that is, on the top of the second compartment 115b. The safety valve 120 is less in number than the compartments 115 (here, six compartments) accommodating the power generating elements 130. The partition walls 111 (111a to 111e) of the module 100 of this embodiment are formed with communication holes 112 (see FIG. 2). The module 100 is accordingly able to safely release gas through the communication holes 112 and the safety valve 120 even if gas is generated from any of the power generating elements 130.

Figure 2B:
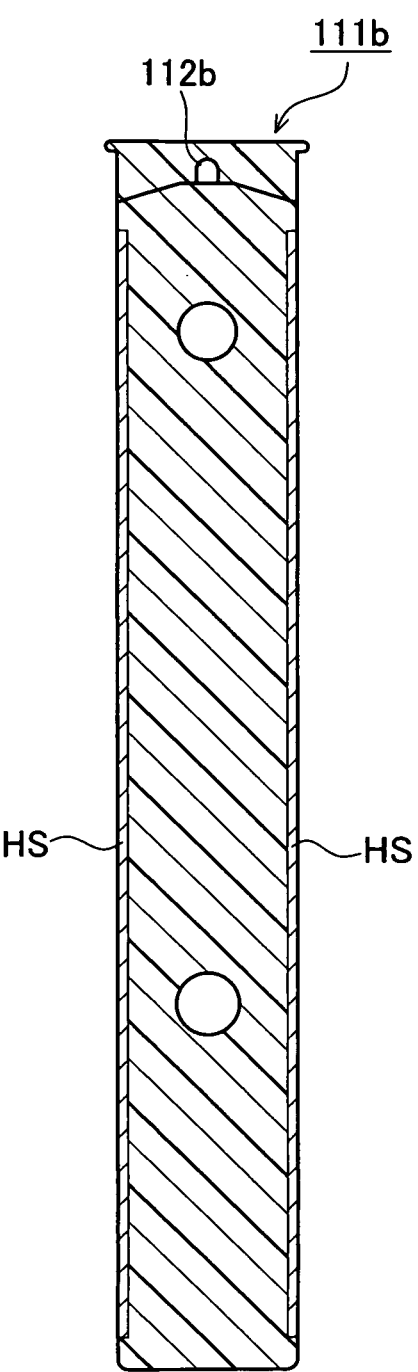
FIG. 2B is a vertical section view of a second partition wall of the module taken along a line B-B in FIG. 1.

FIG. 2A is a longitudinal section view of the first partition wall 111a of the module 100, taken along a line A-A in FIG. 1B. The fifth partition wall 111e has the same section as the first partition wall 111a. FIG. 2B is a longitudinal section view of the second partition wall 111b taken along a line B-B in FIG. 1B. The third partition wall 111c and the fourth partition wall 111e have the same section as the second partition wall 111b. Each of the first to fifth partition walls 111a to 111e is formed with a communication hole 112 (first to fifth communication holes 112a to 112e) formed though an upper part of each partition wall in a wall thickness direction (i.e. in a direction perpendicular to the drawing sheet). Through those communication holes 112a to 112e, the gas (not shown) in the upper areas of the compartments 115 separated adjacently by each partition wall 111 is allowed to flow to and fro between the adjacent compartments. Of the communication holes 112, the first communication hole 112a of the first partition wall 111a and the fifth communication hole 112e of the fifth partition wall 115e are each formed to have a hole area (a minimum sectional area) of 0.4 mm$^2$, which is converted into 0.06 mm$^2$/Ah (=0.4/6.5) per battery module capacity. On the other hand, the second to fourth communication holes 112b to 112d are each formed to have a hole sectional area of 1.0 mm$^2$, which is converted into 0.15 mm$^2$/Ah (=1.0/6.5) per battery module capacity. The first communication hole 112a and the fifth communication hole 112e correspond to an outermost communication hole of the invention.

As above, the six compartments 115 are communicated to one another through the communication holes 112. Even if gas is generated from any of the power generating elements 130, therefore, the gas is allowed to transfer to other compartments 115 through the communication holes 112 and thus the inner pressure of each compartment 115 increases. Then, the safety valve 120 is opened to release the case. To ensure the flow pathway of gas, the hole sectional area of each communication hole 112 is determined to be 0.03 mm$^2$/Ah or more.

On the other hand, the hole sectional area of each communication hole 112 is limited to 0.30 mm$^2$/Ah or less. When oxygen partial pressure in each compartment 115 varies from compartment to compartment due to a difference in quantity of oxygen gas generated from each power generating element 130, the oxygen gas attempts to transfer to another compartment in order to keep a balance in oxygen concentration between the compartments 115 of the battery case 110. However, the transfer of oxygen gas is restricted by the limited hole sectional areas. It is accordingly possible to restrain the generated oxygen gas from transferring to another compartment 115 and to prevent consumption of hydrogen absorbed in the power generating element 130 in the destination compartment 115. This can reduce variations in hydrogen absorbing amount, that is, variations in discharge reserve between the power generating elements 130 in this module 100.

Meanwhile, the inventors of this invention have tested and verified as below the range of hole sectional areas whereby the above advantages could be obtained.

Firstly, an overcharge test was made on modules each having communication holes in partition walls to inspect a relationship between the hole sectional area of each communication hole per battery module capacity and the presence/absence of undesired deformation and breakage of the module due to the increase in inner pressure.

When the module 100 (nickel-metal hydride secondary battery) is further charged (overcharged) from a full charge state (100% SOC), oxygen gas is generated from the positive electrode of each power generating element 130 (OH$^-$→ $\frac{1}{4}$O$_2$↑+$\frac{1}{2}$H$_2$O+e$^-$), the inner pressure of the module 100 increases. Therefore, modules with communication holes of different hole sectional areas were prepared and checked as to whether or not each module could release oxygen gas through safety valve 120 through the communication holes without causing undesirable deformation and breakage when the oxygen gas was generated and the inner pressure of each module was increased.

Specifically, four types of modules were prepared so that each module was similar in configuration to the above module 100 except that each module had five communication holes equal in area. The communication holes were different in size from module type to module type. Each module had a battery capacity of 6.5 Ah. To be more specific, the four types of modules were prepared so that the communication holes of the modules had the hole sectional areas S, equal in each module type but different between module types, of 0.015, 0.030, 0.045, or 0.060 mm$^2$/Ah per battery module capacity. The opening pressure of the safety valve 120 was 0.75 MPa in each module type.

Each module was then subjected to the overcharge test. Specifically, under a temperature of 60° C., each module previously adjusted to 100% SOC was connected to a power source device and charged to 200% SOC by a constant current charge of 32.5 A (5 C). Thereafter, each module was checked as to the presence/absence of deformed or broken modules. The number of test pieces, n, is 10 (n=10) in each module type. The test results are shown in Table 1.

TABLE 1

(n = 10)

| | HOLE AREA OF THROUGH HOLE PER BATTERY MODULE CAPACITY (mm$^2$/Ah) | | | |
|---|---|---|---|---|
| | 0.015 | 0.030 | 0.045 | 0.060 |
| Presence/Absence of undesirably deformed or broken pieces (The number of deformed or broken pieces) | Presence (3 pieces) | Absence (0 piece) | Absence (0 piece) | Absence (0 piece) |

As shown in Table 1, as to the modules with the communication holes each having the hole sectional area S=0.015 mm$^2$/Ah per battery module capacity, three of ten modules were undesirably deformed or broken. This was likely caused by the following reason. A communication hole with S=0.015 mm$^2$/Ah could not allow gas generated in each compartment 115 to sufficiently flow to and fro between the compartments 115 and the gas generated in each compartment 115 could not be released sufficiently through the safety valve 120. This results in an abnormal increase in inner pressure of some of the compartments, which causes deformation and breakage of the battery case. On the other hand, all the modules with the communication holes each having a hole sectional area of 0.030 mm$^2$/Ah or larger were not deformed nor broken and the safety valve could be opened.

The above results show that, if gas is assumed to be generated in a range corresponding to gas generation under condition of overcharge of 5 C, the hole sectional area of each communication hole has only to be set at S=0.030 mm$^2$/Ah, so that each module can release gas through the communication holes and the safety valve even when the gas is generated from any of the power generating elements.

Further, a durability test was made on modules each having communication holes in partition walls to inspect a relationship between the hole sectional area of each communication hole per battery module capacity and the variations in discharge reserve. As mentioned above, the discharge reserve of the negative electrode will vary between the power generating elements due to the oxygen gas moving through the communication holes. If charge and discharge are repeated in such state, the variations will further increase and the module capacity will be deteriorated accordingly. Therefore, the durability test was conducted by repeating charge and discharge to check a correlation between the hole sectional areas of the communication holes and the variations in discharge reserve after the durability test and to determine the hole sectional areas of the communication holes whereby the variations in discharge reserve could be a target limit value or lower even after repeated charge and discharge.

Ten types of modules were prepared so that each module was similar in configuration to the above module 100 except that each module had five communication holes equal in area. The communication holes were different in size from module type to module type. Each module had a battery capacity of 6.5 Ah. To be more specific, the ten types of modules had the communication holes different in hole sectional area S per battery module capacity between the module types in a range of 0.15 to 1.50 mm$^2$/Ah in steps of 0.15 mm$^2$/Ah.

Each module was then subjected to the durability test. Specifically, under a temperature of 50° C., each module was repeatedly charged and discharged 1000 cycles at a constant current of 3 C in a range of 20% to 80% SOC. After the durability test, the variations in discharge reserve were checked by the following technique of measuring an amount of discharge reserve. Specifically, the power generating element in each compartment of the module was discharged to a voltage of 1.0V. Then, the electrolyte was filled in each compartment through a hole formed at the top thereof so that the electrolyte of an excessive amount exists in each compartment. In the electrolyte of each compartment, a reference electrode Hg/HgO was immersed to cause over-discharge of the power generating element in each compartment by measuring a discharge capacity. Here, the amount of discharge reserve was defined by an expression: "Discharge reserve"=X−Y, where X is "Discharge capacity until the electric potential of a negative electrode becomes −0.7 V relative to the electric potential of the reference electrode" and Y is "Discharge capacity until the electric potential of a positive electrode becomes −0.5 V relative to the electric potential of the reference electrode".

Figure 3:
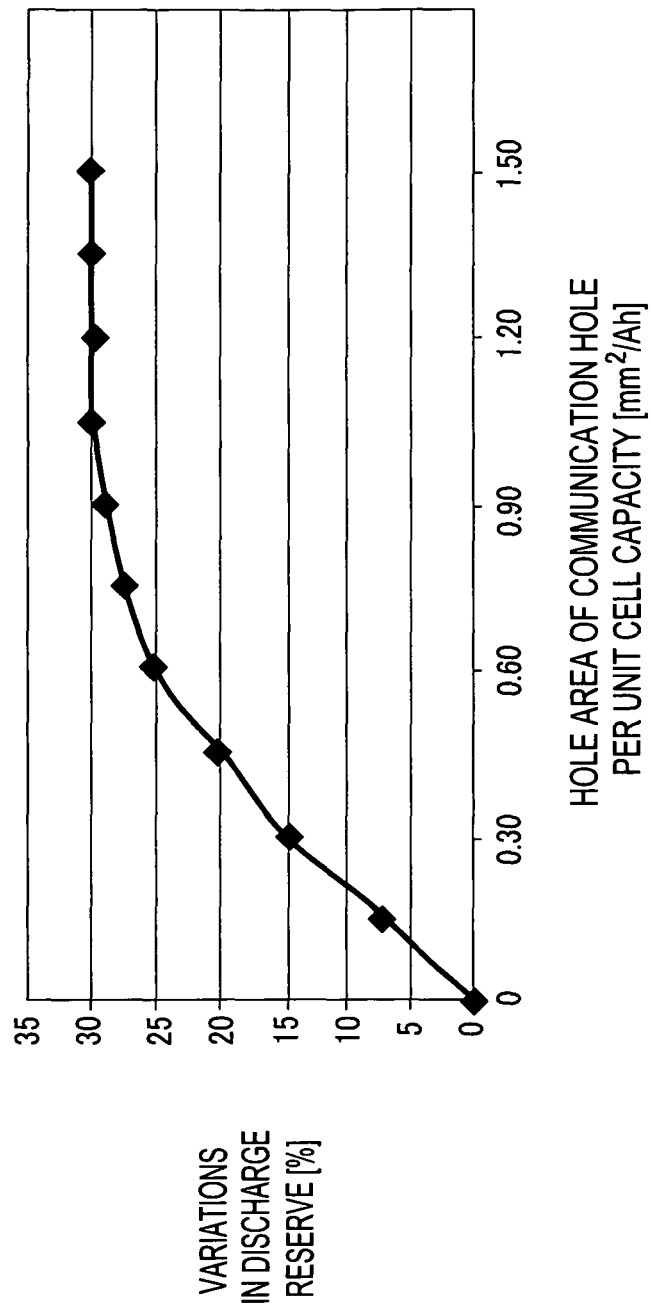
FIG. 3 is a graph showing a relationship between a hole area of a communication hole formed in each partition wall and a variation in discharge reserve between the power generating elements after durability test.

FIG. 3 is a graph showing a relationship between the hole sectional areas of the communication holes per battery module capacity and the variations in discharge reserve between the modules after the durability test. According to this graph, as the hole sectional areas of the communication holes are wider, the discharge reserve variation tends to be higher. However, the graph also shows that, as the hole sectional areas are too wide, an increasing rate of the increase in discharge reserve variation becomes smaller and the variation reaches a peak at about 30%.

In the case where a battery pack is constituted by connecting nickel-metal hydride battery modules in series and used as a power source of an electric vehicle (PEV), a hybrid electric vehicle (HEV), or the like, the life of the battery pack is likely to be shorter as the discharge reserve variation in a module is larger. From this reason, it is desired to set the target limit value of the discharge reserve variation to 15%. Referring to the graph (FIG. 3), it is found that the hole sectional areas of 0.30 mm$^2$/Ah or less could restrain the transfer of oxygen gas between the compartments and further the discharge reserve variation could be restrained to the target limit value (15%) or less even after repeated charge and discharge.

The following explanation is made on the reason why the module 100 is designed such that each hole sectional area (0.06 mm$^2$/Ah) of the first communication hole 112a and the fifth communication hole 112e is set to be smaller than each hole sectional area (0.15 mm$^2$/Ah) of the second communication hole 112b to the fourth communication hole 112d.

The inventors found out from the above durability test that the power generating elements accommodated in the second and fifth compartments were apt to greatly decrease in discharge reserve. Therefore, the module having four or more compartments arranged in a row and three or more partition walls was subjected to the following test to check a relationship between the positions of the compartments connected to one another through the communication holes formed in the partition walls and increased/decreased amounts of the discharge reserve in each power generating element in each compartment.

Firstly, modules each having six compartments partitioned by five partition walls as with the module 100 and having a battery capacity of 6.5 Ah were prepared. In this module, each of the communication holes of the partition walls was 1.5 mm²/Ah. The six compartments are referred to as follows: an outermost one is a first compartment, one next thereto is a second compartment, and one next to the second compartment is a third compartment (the sixth compartment is the other outermost compartment different from the first compartment).

Instead of oxygen gas generation in each compartment, oxygen gas of 1000 ml was injected in the first compartment of the module with a needle of an injector (a gas injection speed was 20 ml/h). This corresponds to a state simulating that oxygen gas of 1000 ml is generated in the first compartment 115a. At that time, the module charge state was set at 60% SOC. During injection, the module temperature remains unchanged and an increased weight of the module by injection was 0.60 g. The third compartment was subjected to the same injection under the same condition as above.

After the injection, the amount of discharge reserve in each power generating element accommodated in the first to sixth compartments were checked by the aforementioned technique of measuring the discharge reserve.

FIG. 4 shows the results thereof and the increase and decrease in the discharge reserve of each negative electrode when oxygen gas of the same quantity occurs in every compartment (power generating element), calculated based on the results.

In FIG. 4, lines L1 and L2 indicate the discharge reserve in the first and third compartments that decreased due to the oxygen gas injected into the first and third compartments. The numerical values in lines L1 and L2 represent how much the discharge reserve (Ah) of the power generating element (negative electrode) accommodated in each of the first and third compartments decreased due to the injected oxygen gas. For example, 0.86 Ah of the first compartment in line L1 represents that the amount of discharge reserve of the power generating element (negative electrode) housed in the first compartment decreased by 0.86 Ah.

It is found from this result that the discharge reserve decreased in the power generating elements accommodated in not only the first or third compartment injected with oxygen gas but also in other compartments. This is thought because part of the oxygen gas injected in the first or third compartment transferred to other compartments through the communication holes and therefore the discharge reserve of the power generating element in the destination compartment decreased.

An increased amount of discharge reserve shown in the lines L1 and L2 can be converted into a percentage relative to the total 100% as shown in lines L3 and L5 respectively. The decreased amount of discharge reserve of each compartment is considered to be proportional to the oxygen gas amount distributed in that compartment. Accordingly, the line L3 also indicates a distribution rate representing what percentage of the oxygen gas injected (generated) in the first compartment was moved and distributed to each compartment in addition to the first compartment through the communication holes. This is also revealed by the fact that the distribution rate is higher for the first compartment and becomes lower toward the sixth compartment. The same applies to the line L5. This line L5 is considered to indicate the distribution rate showing what percentage of oxygen gas generated in the third compartment was moved and distributed to other compartments in addition to the third compartment through the communication holes.

Further, the line L4 indicates the resultant increased/decreased amounts of discharge reserve occurring in each power generating element in each compartment due to the oxygen gas generated in the first compartment, relative to the distribution rate in L3.

Inherently, all the oxygen gas generated in the first compartment is likely to combine with hydrogen again in the negative electrode in the power generating element in the first compartment. In this case, the discharge reserve of each compartment cannot change. However, the existence of the communication holes allows part of the oxygen gas to transfer (be distributed) to other compartments through the communication holes. This will decrease the amount of discharge reserve of the transfer destination (distribution destination) compartment depending on the distribution rate of oxygen gas. In the contrary, it is conceivable that, in the first compartment from which the oxygen gas is released to other compartments, the amount of oxygen gas to be essentially absorbed by recombination has decreased and thus the discharge reserve has increased.

Each negative numeral values in the line L4 means that the amount of discharge reserve in the relevant compartment decreases due to the oxygen gas originating from the first compartment. Each absolute value of the decreased amount of discharge reserve of each of the second to sixth compartments is equal to each value of the distribution rate in L3. Reversely, each positive numeral value means that the discharge reserve in the relevant compartment (the first compartment) increases as the oxygen gas generated in the first compartment flows out therefrom through the communication holes. In other words, the discharge reserve in the first compartment increases by a sum of the decreased amounts of discharge reserve in other compartments.

Based on the results of oxygen injection in the third compartment shown in the line L2, the distribution rate of oxygen gas generated in the third compartment and the increased/decreased amounts of discharge reserve due to the oxygen gas generated in the third compartment, which were obtained in a similar manner to the above lines L3 and L4, are shown in lines L5 and L6 respectively.

The distribution rate of oxygen gas generated in the second compartment is shown in line L7. This was obtained based on the results in the above lines L3 and L5. Specifically, based on the results in L3 and L5, the distribution rate in the second compartment was determined as an average of the value of the first compartment in L3 and the value of the third compartment in L5. The distribution rates in the third to sixth compartments were determined to be ½, ¼, ⅛, and 1/16 of the value to the second compartment. Based on the results in L7, the increased/decreased amounts of discharge reserve caused by the oxygen gas generated in the second compartment, which were obtained in a similar manner to L4 and L6, are shown in line L8.

Each module used in the test was configured such that the compartments were arranged in a row, in which the fourth, fifth, and sixth compartments were located symmetrical to the third, second, and first compartments respectively. Accordingly, the increased/decreased amounts of discharge reserve due to the oxygen gas generated in the fourth to sixth compartments was considered to be symmetric to the results obtained from the third to first compartments and hence were prepared by use of the lines L4, L6, and L8 (see the lines L9, L10, and L11).

Finally, in the case where the same amount of oxygen gas is generated in every compartment, such oxygen gas is considered to simultaneously occur in every compartment. Accordingly, the increased/decreased amounts of discharge reserve can be obtained by summing increased and decreased amounts of discharge reserve calculated in each compartment (L4, L6, L8, L9 to L11).

This calculation result is shown in line L12. It is found from this result that, in the module with the partition walls having the communication holes equal in hole sectional area, the amount of discharge reserve in the second and fifth compartments decreased. In contrary, the discharge reserve in the first and six compartments increased.

When the module having the communication holes equal in hole sectional area to each other as with the above module is continuously used, the discharge reserve of the power generating element accommodated in each of the second and fifth compartments greatly decreases, while the discharge reserve of the power generating element accommodated in each of the first and sixth compartments reversely increases. Therefore, it is considered that the variations in discharge reserve in this module will gradually increase.

The reason of the above test results is conceived as follows.

The outermost compartment represented by the first compartment 115a and the inside compartment represented by the second compartment 115b are different in the number of communication holes allowing communication between own compartment and another compartment. For the first compartment 115a, there is only the first communication hole 112a formed in the first partition wall 111a which is the outermost partition wall. For the second compartment 115b, on the other hand, there are two communication holes; the communication holes 112a and 112b formed in the second partition walls 111a and 111b defining the second compartment 115b.

Herein, suppose the case that oxygen gas is generated from the power generating element 130 accommodated in the second compartment 115b having two communication holes and oxygen gas partial pressure in the inside compartment increases than in other compartments. In this case, much of the generated oxygen gas is recombined with hydrogen of the negative electrode in this inside compartment to make water. Part of the oxygen gas is allowed to transfer to other adjacent compartments (the first compartment 115a and the third compartment 115c) through the two communication holes because of high partial pressure. In other words, part of the oxygen gas is split into two flows that transfer to other compartments.

On the other hand, in the case where oxygen gas is generated from the power generating element 130 accommodated in the first compartment 115a and oxygen gas partial pressure increases therein than in other compartments, the oxygen gas transfers to the second compartment 115b next to the first compartment 115a which is the outermost compartment through the single outermost communication hole 112a. That is, the oxygen gas is not split and transfers to the next second compartment 115b.

Accordingly, regarding the second compartment 115b which is the inside compartment, part of oxygen gas generated in the second compartment 115b itself will transfer to adjacent compartments (the first compartment 115a and the opposite adjacent third compartment 115c). However, both the second compartment 115b and the third compartment 115c are the inside compartments (having two communication holes) and placed under almost the same condition. From a long-term viewpoint, therefore, the oxygen gas transfer from one compartment to the other component and the oxygen gas transfer from the other to one are considered to balance out, resulting in almost the same amount.

As to the oxygen gas transfer to the first compartment 115a through the first communication hole 112a, from a long-term standpoint, the transfer from the first compartment 115a to the second compartment 115b will become larger in amount than the reverse transfer.

Considering all the above conditions, in this second compartment 115b, the hydrogen absorbed in the power generating element 130 will be much consumed by oxygen gas that has transferred therein from the other compartments (in particular, the first compartment 115a). Specifically, it is considered that the discharge reserve of the power generating element (negative electrode) accommodated in the second compartment 115b greatly decreases. The same applies to the five compartment 115d.

In the module 100 of this embodiment, as mentioned above, the hole sectional area of each of the first communication hole 112a formed in the first partition wall 111a and the fifth communication hole 112e formed in the fifth partition wall 111e is set to be smaller than the hole sectional area of each of the second, third, and fourth communication holes 112b, 112c, and 112d formed in the second, third, and fourth partition walls 111b, 111c, and 111d respectively. This makes it possible to reduce transfer of oxygen gas allowed to pass through the first communication hole 112a and the fifth communication hole 112e. In other words, it is reliably possible to restrain the oxygen gas from transferring from the first compartment 115a to the second compartment 115b and hence to prevent consumption of hydrogen absorbed in the power generating element 130 accommodated in the second compartment 115b and resultant reduction in discharge reserve. Similarly, it is surely possible to restrain the oxygen gas from transferring from the sixth compartment 115f to the fifth compartment 115e and hence to prevent consumption of hydrogen absorbed in the power generating element 130 accommodated in the fifth compartment 115e and resultant reduction in discharge reserve.

A manufacturing method of the module 100 of the present invention will be explained below referring to FIGS. 5 to 8.

The battery case 110 of the module 100 is made by welding a cover 140 and a case body 150 which will be mentioned later. Cover-side partition wall portions 141 (a first cover-side partition wall portion 141a to a fifth cover-side partition wall portion 141e) which will be mentioned later are welded to body-side partition wall portions 151 (a first body-side partition wall portion 151a to a fifth body-side partition wall portion 151e) to constitute respective partition walls 111 (the first partition wall 111a to the fifth partition wall 111e) of the battery case 110.

FIGS. 5A to 5C show the case body 150 before welding; FIG. 5A is a top view, FIG. 5B is a side view, and FIG. 5C is an enlarged sectional view of the case body 150 taken along a line C-C and a line D-D in FIG. 5B.

The case body 150 is of a rectangular box shape made of resin, in which five body-side partition wall portions 151 (the first to fifth body-side partition wall portions 151a to 151e) are arranged in upright position on a bottom plate 157 of the case body 150. Each of the body-side partition wall portions 151 is of a plate shape made of resin as with the case body 150 and will be welded to the cover-side partition wall portions 141 of the cover 140. Specifically, of the body-side partition wall portions 151, a body-side melting portion 153 located at an upper end will be butt-welded to cover-side melting portions 143 which will be mentioned later.

FIGS. 6A to 6C are views of the cover 140 (before welding) which will constitutes the battery case 110; FIG. 6A is a side view, FIG. 6B is a sectional view of the cover 140 taken along a line F-F in FIG. 6A, and FIG. 6C is a sectional view of the same taken along a line G-G in FIG. 6C.

The cover 140 is made of resin and has a rectangular tray-like shape including a nearly upper plate 147 and a frame 148 vertically protruding from the peripheral edge of the upper plate 147. Within this frame 148, five cover-side partition wall portions 141 (the first to fifth cover-side partition wall portions 141*a* to 141*e*) are provided. These five cover-side partition wall portions 141 are arranged so as to equally divide the inside area of the cover 140 into six sections in a longitudinal direction DL 3. Each cover-side partition wall portion 141 is formed, as with the frame 148, vertically protruding from the upper plate 147.

Each cover-side partition wall portion 141 includes a communication groove 142 (a first to fifth communication groove 142*a* to 142*e*) located at almost the center of a front surface 144 and a rear surface 145 in the longitudinal direction DL3 and two cover-side melting portions 143 which are located below the communication groove 142 and will be melted and butt-welded to the body-side partition wall portions 151 of the case body 150 (see FIGS. 6B and 6C).

The communication groove 142 is formed through the cover-side partition wall portion 141 in its thickness direction (in the longitudinal direction DL3 of the cover 140) to provide communication between the front surface 144 and the rear surface 145. Further, this groove 142 opens (an opening OGa or OGb) between the cover-side melting portions 143 (opens downward in the figure). In short, the groove 142 opens (in a butting direction DJ) on the side which will face the body-side partition wall portion 151 of the case body 150 when set in place for welding.

On the other hand, the cover-side melting portions 143, 143 are formed as two rectangular projecting portions spaced in the groove width direction DH (a lateral direction in the figure) relative to opening edges 146 of the communication groove 142 on the side which will face the body-side partition wall portion 151 (in the butting direction DJ) and also the melting portions 143, 143 are formed to protrude in the butting direction DJ (downward in the figure) relative to the communication groove 142 (see FIGS. 6B and 6C).

Of the communication hole 142 formed in the cover-side partition wall portion 141, a first communication groove 142*a* of the first cover-side partition wall portion 141*a* shown in FIG. 6B is formed as a deep groove having a sectional area of 0.6 mm$^2$ (0.09 mm$^2$/Ah per battery module capacity) and a dimension LTa in the butting direction (in a vertical direction in the figure) longer than a dimension LHa in the width direction (LHa<LTa). A fifth communication groove 142*e* (not shown) formed in the fifth cover-side partition wall portion 141*e* has the same shape as above.

On the other hand, a second communication groove 142*b* of the second cover-side partition wall portion 141*b* shown in FIG. 6C is similarly formed as a deep groove having a sectional area of 1.4 mm2 (0.22 mm$^2$/Ah per battery module capacity) and a dimension LTb in the butting direction (in a vertical direction in the figure) longer than a dimension LHb in the width direction (LHb<LTb). Accordingly, the dimension LHb in the groove width direction DH and the dimension LTb in the butting direction are determined to be larger than the dimensions LHa and LTa of the first communication groove 142*a* respectively (LHb>LHa and LTb>LTa). A third communication groove 142*c* and a fourth communication groove 142*b* (both not shown) formed in the third cover-side partition wall portion 141*c* and the fourth cover-side partition wall portion 141*d* have the same shapes as above.

In the manufacturing method of the module 100 in the present embodiment, a case welding step will be explained below with reference to FIGS. 7 and 8. FIG. 7 shows a state where the first cover-side partition wall portion 141*a* (see FIG. 6B) is joined to the first body-side partition wall portion 151*a* (see FIG. 5C). FIG. 8 shows a state where the second cover-side partition wall portion 141*b* (see FIG. 6C) is joined to the second body-side partition wall portion 151*b* (see FIG. 5C). For manufacture of the module 100, a well known technique may be utilized excepting the case welding step and its detail explanation is omitted here. In the case welding step, the above cover 140 and the case body 150 are welded. The following explanation is particularly given with a focus on the steps of forming the first partition wall 111*a* having the first communication hole 112*a* and the second partition wall 111*b* having the second communication hole 112*b*. Of course, the power generating elements 130 are previously set in the case body 150 and connected with terminal members or the like as needed.

Firstly, the cover-side melting portions 143 (143*a*, 143*b*, ... ) of the cover-side partition wall portions 141 (141*a*, 141*b*, ... ) of the cover 140 and the body-side melting portions 153 (153*a*, 153*b*, ... ) of the body-side partition wall portions 151 (151*a*, 151*b*, ... ) are melted or fused. Specifically, end surfaces 143F of the cover-side melting portions 143 and an end surface 153F of the body-side melting portion 153 are respectively placed in contact with the surfaces of a hot plate H heated to a high temperature, thereby softening (melting) a resin material on and around the contact portions (see FIGS. 7A and 8A).

When softened, the cover-side melting portions 143 and the body-side melting portion 153 are separated from the hot plate H and then promptly the cover 140 and the case body 150 are placed in butting relation in the butting direction DJ so that respective lead surfaces 143F and 153F contact with each other, and the cover 140 and the case body 150 are pressed against each other. Thus, the softened resin MC that forms the cover-side melting portions 143 and the body-side melting portion 153 will be deformed and moved. Part of this deformed-moving softened resin MC flowing toward the opening edges 146 of the communication groove 142 (142*a*, 142*b*) will move by filling a clearance between the two cover-side melting portions 143 (see FIGS. 7B and 8B).

As the cover 140 and the case body 150 are continuously pressed against each other in the butting direction DJ, the clearance between the cover-side melting portions 143 is filled up with the softened resin MC derived from the cover-side melting portions 143 and the body-side melting portion 153. This softened resin MC reaches the opening edges 146 to close the opening OGa or OGb of the communication groove 142 facing the body-side partition wall (see FIGS. 7C and 8C).

At the time when the height of the battery case 110 then becomes a predetermined value, the application of pressing the cover 140 and the case body 150 is stopped. After cooling, melted portions TC squeezed out of the battery case 110 and solidified are removed. Thus, the welding of the cover 140 and the case body 150 is finished and the battery case 110 is completed (see FIGS. 7*d* and 8*d*). In the battery case 110, the cover-side partition wall portions 141 and the body-side partition wall portions 151 form the partition walls 111 (the first partition wall 111a, the second partition wall 111b) having the communication holes 112 (the first communication hole 112a, the second communication hole 112b). The hole sectional area per battery module capacity of the first communication hole 112a is 0.06 mm2/Ah (the same applies to the fifth communication hole 112e). On the other hand, the hole sectional area per battery module capacity of the second communication hole 112b originating from the second communication groove 142b is 0.15 mm2/Ah (the same applies to the third communication hole 112c and the fourth communication hole 112d).

Thereafter, injection of electrolyte, attachment of the safety valve 120, and others are conducted by well known techniques to complete the module 100.

As mentioned above, according to the manufacturing method of the module 100 in the present embodiment, in the cover 140, each communication groove 142 is formed in each cover-side partition wall portion 141, while the cover-side melting portions 143 are provided in positions spaced from the opening edges 146 of the cover-side partition wall portion 141. The cover-side partition wall portions 141 and the body-side partition wall portions 151 are butt-welded to each other. Simultaneously, the resin MC derived from the molten cover-side melting portions 143 or body-side melting portions 153 fill the clearance between the cover-side melting portions 143 to reach the opening edges 146 of the communication groove 142. In other words, the molten resin MC does not directly move to the opening edges 146 of the communication groove 142. The molten resin MC is caused to move to the opening edges 146 while filling up the clearance between the cover-side melting portions 143, so that the amount of resin MC moving to the opening edges 146 can be reduced. This makes it possible to prevent the resin MC from deeply entering the communication groove 142 and filling up the entire communication groove 142.

By causing the resin MC to reach at least the opening edges 146 of the communication groove 142, the opening OGa or OGb of the communication groove 142 can be closed and the communication hole 112 can be formed by partially including at least part of the communication groove 142. Thus, the module 100 provided with the partition walls 110 having the communication holes 112 can reliably be manufactured.

When the sectional area of each communication groove 142 is previously adjusted, the hole sectional area of each communication hole 112 to be formed can appropriately be adjusted to an area of 0.03 to 0.30 mm²/Ah. With the above configuration, the module 100 can be manufactured so that even if the inner pressure of any the compartments 115 abnormally increases due to gas generation from the power generating element 130, the safety valve 120 less (single) in number than the compartments 115 can be opened to release the gas through the communication holes 112. Further, the module 100 can be manufactured readily and reliably such that even if oxygen gas attempts to transfer to other compartments because of a difference in oxygen partial pressure between the compartments 115, such gas transfer can be reduced and hence variations in discharge reserve can reliably be reduced.

In the present embodiment, each communication groove 142 is designed as a deep groove shape having the dimension LT in the butting direction larger than the dimension LH in the groove width direction. In the case welding step, therefore, after the openings OGa and OGb are blocked by the molten resin MC that has flowed to the opening edges 146, this resin is hard to further deeply enter the communication grooves 142. Accordingly, the module 100 can be manufactured so that each communication groove 142 is unlikely to be filled up with the resin MC, and each communication hole 112 can be reliably be formed with a hole sectional area per battery module capacity in a range of 0.03 to 0.30 mm²/Ah.

The present invention is explained along the above embodiment but not limited thereto, and the present invention may be embodied in other specific forms without departing from the essential characteristics thereof.

For instance, each communication groove 142 is provided in the cover-side partition wall portion 141 in the above embodiment. Alternatively, each communication groove may be provided in the body-side partition wall portion 151. A member (a metal plate, a resin plate, etc.) previously formed with communication holes may be prepared in advance so that this member is fixed between the cover-side partition wall portions and the body-side partition wall portions during welding to provide the communication holes in the partition walls. Moreover, a case body having body-side partition wall portions with no hole and others may be produced and communication holes may mechanically be formed later.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A nickel-metal hydride secondary battery module comprising:
   a plurality of power generating elements each having a negative plate containing a hydrogen absorbing alloy;
   a battery case provided with partition walls and a plurality of compartments, each of the partition walls having at least two of the compartments arranged adjacently on each of two sides thereof, each of the compartments accommodating at least one of the power generating elements,
   a plurality of gas intercommunication holes, wherein each of the partition walls comprises one of the gas intercommunication holes, the gas intercommunication holes allowing for a gas to pass between the compartments; and
   at least one of safety valves placed on the battery case, the safety valves being less in number than the number of the compartments;
   wherein each of the gas intercommunication holes has a hole sectional area per battery module capacity in a range of 0.03 to 0.30 mm²/Ah,
   wherein the battery case is formed of a first case member and a second case member, both being made of resin and being welded to each other in a butting relation,
   the first case member including a plurality of plate-shaped first partition wall portions, each first partition wall portion forming part of one of the partition walls,
   the second case member including a plurality of plate-shaped second partition wall portions, each second partition wall portion forming another part of one of the partition walls, each second partition wall portion being welded to a corresponding first partition wall portion in the butting direction of the first case member and the second case member,
   each intercommunication hole including a communication groove extending in a thickness direction of each of the first partition wall portions to provide communication between front and rear surfaces thereof, the communication groove having a shape opening in a side which will face one of the second partition wall portions when the corresponding first partition wall portion is to be welded to the second partition wall portion; and each intercommunication hole having a shape having a larger dimension in the butting direction than a dimension in a groove width direction perpendicular to the butting direction and the thickness direction.

2. The nickel-metal hydride secondary battery module according to claim 1, wherein the battery case includes four or more compartments and three or more partition walls, wherein the partition walls located in outermost ends in a row direction of the compartments are outermost partition walls, wherein the gas intercommunication holes of the outermost partition walls each have a hole sectional area smaller than the hole sectional area of the gas intercommunication holes formed in the partition walls other than the outermost partition walls.

* * * * *